United States Patent [19]
Faircloth et al.

[11] 3,913,758
[45] Oct. 21, 1975

[54] HORTICULTURE APPARATUS

[75] Inventors: Paul G. Faircloth, Apopka; Carl R. Apthorp, III, Leesburg, both of Fla.

[73] Assignee: Green Thumb Corporation, Apopka, Fla.

[22] Filed: June 15, 1973

[21] Appl. No.: 370,391

[52] U.S. Cl. ............... 214/38 BB; 47/17; 104/48; 193/35 R; 214/38 D; 214/84; 214/515
[51] Int. Cl.² ........................................ B65G 67/02
[58] Field of Search .......... 214/38 B, 38 BA, 38 BB, 214/38 D, 84, 152, 515, 516, 517, 16 B; 193/35 R, 35 C; 47/17; 104/48

[56] References Cited
UNITED STATES PATENTS

| | | | |
|---|---|---|---|
| 602,395 | 4/1898 | Emerson | 214/16 B |
| 1,753,980 | 4/1930 | Baumgartner | 214/38 D X |
| 2,127,972 | 8/1938 | Hutchinson et al. | 214/38 BB |
| 2,416,071 | 2/1947 | Shonnard | 214/38 BB X |
| 2,650,731 | 9/1953 | Adler | 214/515 |
| 2,949,863 | 8/1960 | Cozzoli | 193/35 C X |
| 3,233,761 | 2/1966 | McCartney et al. | 214/84 |
| R12,620 | 3/1907 | Slick | 214/38 BB X |

Primary Examiner—Robert G. Sheridan
Attorney, Agent, or Firm—Duckworth, Hobby & Allen

[57] ABSTRACT

A horticulture apparatus for handling plants within a greenhouse, or the like, in which the plants and containers are loaded upon pallets which in turn are loaded upon wheeled carts and moved to supporting racks within a greenhouse. The pallets are then transferred from the carts to the racks. The carts and racks each have parallel roller tracks spaced at a predetermined distance for the pallets to roll upon. The pallets each have cylindrical runners on the bottom thereof in parallel spaced relationship to ride in the parallel spaced tracks of the carts. The pallets can be easily slid from the carts to the support racks and back onto the carts and the carts also have a locking system for preventing the pallets from rolling off the cart tracks during movement of the carts and the cart and rack tracks have arcuate end portions for aligning the pallets when shifting the carts therebetween. The cart frame may also be divided with the top part and cart tracks for the runners to slide in so that a more precise alignment can be had between the cart pallet tracks and the support rack tracks. The carts are made to be spaced uniformly with a plurality of carts pulled by a single vehicle which can stop at marked points for unloading a plurality of pallets onto a plurality of spaced and marked off support racks for each stop of the towing vehicle.

5 Claims, 5 Drawing Figures

HORTICULTURE APPARATUS

BACKGROUND OF THE INVENTION

The present invention relates to a horticulture system for transplanting potted plants, or the like, being rooted or grown from seeds in greenhouses in which the plants and containers are loaded onto pallets which are loaded onto specially built carts transported to specially built racks where the pallets can be pushed from the carts onto the rack or, alternatively, from the racks back onto the carts by a single operator.

In the past it has been common to provide a great variety of systems for the operation of greenhouses, as well as a great variety of pallet handling systems. One frequently used system handles loaded pallets with a forked lift truck which can lift, transport and place pallets in predetermined locations and can stack the pallets and racks one over the other.

The horticulture system of the present type uses a greenhouse and includes the planting of seeds sown in flat containers or cuttings from foliage plants potted in separate pots which are grown in the greenhouses until rooted or sprouted. In the case of seeds, the seeds are sown in flat containers either automatically or manually. The flat containers are placed on pallets already placed on carts; and the carts are moved to the racks within the greenhouse in which the seeds are left to sprout. When the seeds are sprouted, the racks are moved to a transplanting or dibbling area.

In the case of foliage plants, cuttings are placed in individual flower pots or containers filled with soil. The individual pots are then placed on the trays; and the trays are placed upon pallets located on top of carts. The carts are moved with the pallets to the growing racks within the greenhouse and are placed on the racks. Once the cuttings are rooted, which normally takes 2 to 10 weeks, the pallets are loaded back on the carts and moved to the packing area. In the case of larger potted plants, the pots are carried directly on the pallets rather than placed in trays on the pallets.

There have been numerous suggestions in the past for handling pallets loaded with various types of plants and especially in mushrooms where conveyors or carts move groups of plants to a growing area.

One typical apparatus for cultivating plants may be seen in U.S. Pat. No. 3,717,953 in which plants such as mushrooms are positioned in receptacles which are stacked from movable carts for processing. Another such system may be seen in U.S. Pat. No. 1,753,980 which is a means for utilizing the waste space in hothouses and uses carts riding on a rail system; And in U.S. Pat. No. 3,540,318, a transfer pallet system is illustrated in which pallets are moved through a series of work stations in which pallets may be transferred perpendicular or to each work station.

SUMMARY OF THE INVENTION

The present invention provides a system for the transportation of plants on pallets loaded upon carts to and from pallet support racks precisely laid out on a level hard floor in a greenhouse or other growing area. The carts and support racks each have a pair of roller tracks and the pallets each have a pair of runners adapted to ride in the tracks. The pallets riding on the runners can be easily pushed on the track rollers from the carts to the supporting racks in the greenhouses and back from the racks onto the carts. The cart has a wheeled frame and spaced parallel tracks having oil impregnated wooden rollers with metal sleeves on the bottom and guides on the sides which support pallets having parallel cylindrical rails attached to the bottom thereof for riding on the cart track rollers. The pallets can be slid out from either side of the carts. The pallet support racks located in the greenhouses area have a supporting frame supporting pairs of parallel tracks having rollers on the bottom thereof spaced identical with the spacing of the tracks on the cart and also at the same height so that the carts can be aligned with the support racks and the pallets slid from one to the other. The tracks have guides for the pallet runners which have arcuate shaped ends so that the pallet will be captured even with slight misalignment when moving from the carts to the support racks or from the support racks back to the carts and the carts have a locking system for holding the pallets on the carts and transporting the pallets thereon which can be quickly moved by sliding the pallets off the carts. Since the support racks for the pallets are precisely laid out, each rack is adapted to hold a plurality of pallets and the carts are spaced precisely between each other. A towing vehicle can pull a plurality of carts each having one loaded pallet thereon and can be stopped at marked points on the floor or walls of the growing area so that all of the carts simultaneously line up with a plurality of support racks and the driver can quickly load or unload the carts by shoving each pallet onto the support rack or from the support rack onto the cart. The carts have a frame divided into two sections, the top section attached to a pair of rails which rides upon roller tracks on the bottom section so that further alignment of the cart and rack tracks can be accomplished. The two sections are locked together and the pallets held on the carts by actuation of a single locking mechanism.

DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
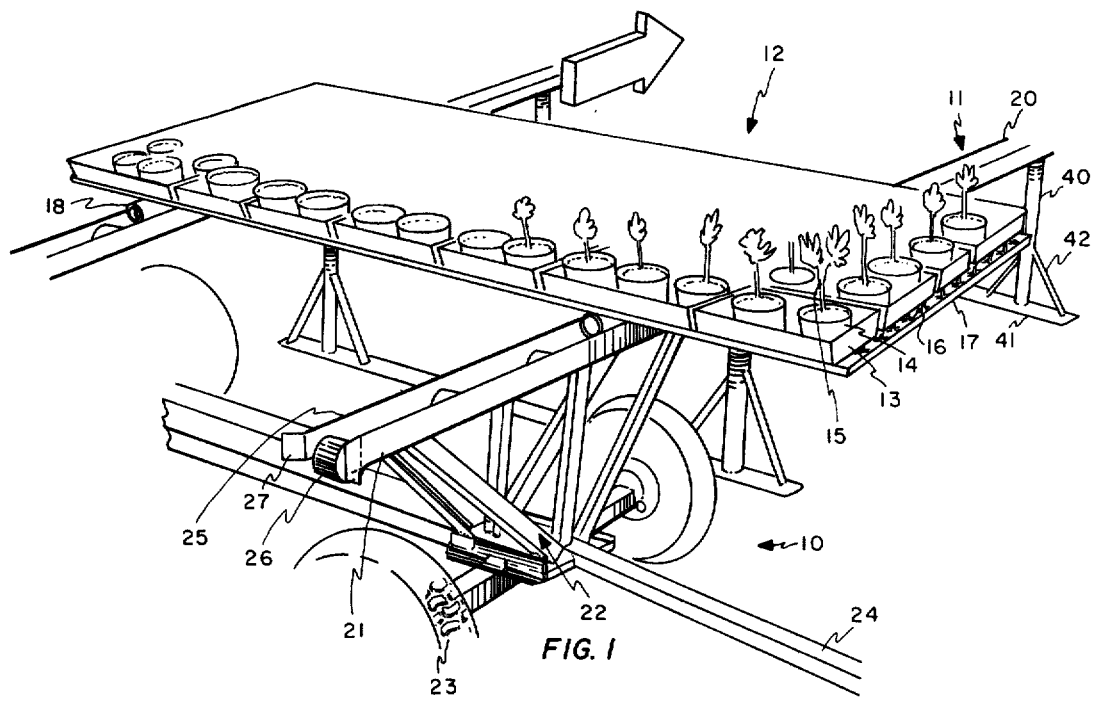
FIG. 1 is a perspective view of a cart, support rack and pallet in alignment with the pallet being transferred from the cart to the support rack.
Figure 2:
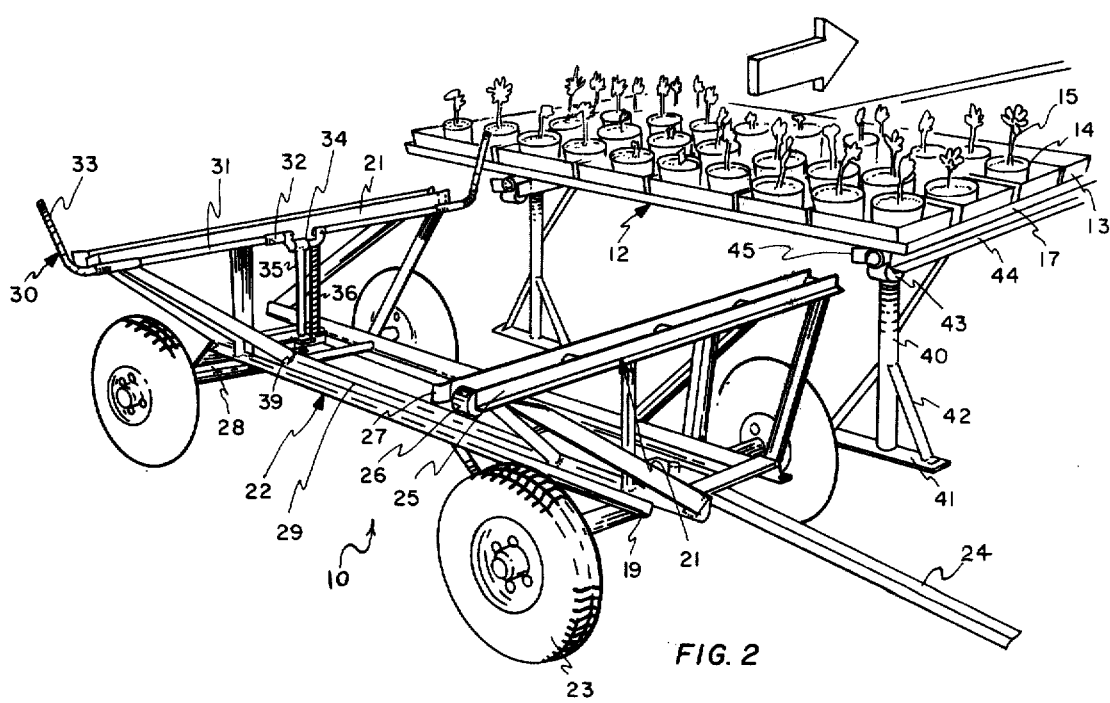
FIG. 2 is a perspective view of a second embodiment of a cart support rack and pallet illustrated with a pallet loaded onto the support rack.

Referring now to FIGS. 1 and 2, a wheeled cart 10 is seen parked next to a pallet support rack 11 and having a pallet 12 passing from the cart 10 to the rack 11. Pallet 12 is loaded with containers 13 having planting pots 14 filled with soil and containing plants 15 therein. The containers 13 are setting upon the bottom of the pallet 16 which may be steel wire connected to a welded steel frame 17. A pair of cylindrical runners 18 may be galvanized steel pipe, or the like, connected to the bottom of the pallet 12 such as by welding to the frame 17 and are parallel and separated by a predetermined distance. The runners 18 are separated to ride on a pair of tracks 20 of the racks 11 and a pair of tracks attached to the cart 10 so that the pair of tracks 20 are attached parallel to each other at substantially the same distance that separates the runners 18 and the tracks 21 are attached parallel at the same distance as the tracks 20 of the rails 18. Cart 10 has a frame 22 having wheels 23 attached thereto and a tongue 24 which can be attached to a towing vehicle to pull the frame 22 on wheels 23. Frame 22 is built to have the tracks 21 at the same height as the tracks 20 but slight adjustments can be made by varying the tire pressure in the tires 23 or by shimming up or otherwise varying the height of the tracks 20. Tracks 21 include a pair of guide members 25 which may be angle iron, or the like, welded to the frame 22 and has a plurality of wooden rollers 26 which may be a hard wood impregnated with oil, having steel sleeves for riding upon stainless steel shafts connected between the guide members. The guide members 25 have arcuate or curved ends 27 at each end of the tracks 21. The cart 10 has axles 28 that connects the wheels 23 to the frame and in addition has pallet locking bars 30 which includes an elongated bar portion 31 held in sleeves 32 to the track 21 and having a pair of swingable upward extending arms 33 so that when the arms 33 extend upward, in the upright position they prevent pallet 12 from sliding off the cart 10 when the cart is being moved between locations. The pair of arms 33 are interconnected and located on either side of the cart 10 and allow the arms to be raised or lowered from either side of the cart so that the pallet can be slid off of the rail 21 from either side. The arms are held in their up or down position by means of attached U-shaped bar 34 which acts in connection with a spring 36 so that the arms can be swung forward to move them out of the way but are held in position by spring 36. A bar 35 has a sleeve at one end connected to U-shaped bar 34 and slides through a hole in a bracket 39 (FIG. 5) to lock two portions of the frame 22 together in the embodiments of FIGS. 2 and 5, as will be described in more detail hereafter. The arms 33 can be pulled up and held in position by spring 36 applied to member 34 which applies a torque to the bar 31 pulling bar 34 against track 21 which acts as a stop. In FIG. 1 cart 10 has a single welded frame 22 attached to the axles 28. In FIG. 2, frame 22 has lower frame members 19 which includes a pair of parallel tracks connected between axles 28 of the cart 10 and includes rollers 9 (FIG. 5) attached to the bottom thereon for rails to ride on. Tracks 19 are similar to the tracks 20 or 21 and have rollers riding on steel shafts. The upper frame portion 29 has a pair of steel runners or rails welded to the remainder of the frame which supports the tracks 21 so that the tracks 21 and frame portion 29 can be moved short distances on the tracks 19 for making greater alignments between the tracks 21 and the tracks 20 for the pallet 12. The two frame portions 19 and 29 are held together when the cart is being moved between locations by the lifting of the locking mechanism 30 which allows the bar 35 to slide into an opening in the bracket 39 to lock the two frame members together and is automatically released upon lowering the arm 33 and raising the locking bar 35 as the U shaped member 34 is rotated. This latter feature of shifting one portion of tht cart relative to the second portion is not always necessary but allows less skilled drivers to be able to quickly position the pallets if the towing vehicle does not stop on the precise marked space.

The pallet support racks 11 have frame members 40 having a base member 41 and support brackets 42 with the base member 41 interconnecting pairs of the frame members 40 to fix the distance between the parallel tracks 20; and have wooden rollers 43 which are the same as the wooden rollers 26 and which ride on steel shafts attached to pairs of guide members 44 which have arcuate ends 45.

FIG. 1 illustrates the cart 10 having its tracks 21 aligned with the tracks 20 of the pallet support racks 11 and the pallet 12 being pushed on the cart to the racks 11, with FIG. 2 having the pallets 12 completely upon the support racks 11 and the stop bars 33 pulled up into their locking position. Thus, in operation, the cart 10 is loaded with a pallet 12 having the containers 13 and 14 loaded thereupon by sliding the pallet 12, runners 18 over the tracks 21 rollers 26. The locking system 30 is pulled up to hold the pallet 12 upon the cart 10 and the tongue 24 of the cart is connected to a towing vehicle or to another cart which is connected to a towing vehicle which then pulls the cart or carts through the greenhouse into the location that the cuttings 15 are to be rooted, at which time the towing vehicle stops at a market point which automatically aligns the cart or carts 10, tracks 21 with the tracks 20 and the safety locking mechanism 30 has the arms 33 pushed down out of the way by the driver of the vehicle who then can give each pallet 12 a shove so that the runners 18 will ride over the rollers 26 and onto the track 20, rollers 43, and continue rolling on the tracks 20 until they reach a stopping point against the end of the tracks 20 or against another pallet 12 that has been loaded on the racks 11. It will be observed that tracks 10 are built so that with tongues 24 may separate the carts 10 at a predetermined distance from the towing vehicle or a predetermined distance between a plurality of carts so that a plurality of carts will line up simultaneously with a plurality of supporting racks 11. When the plants 15 are routed, the empty carts 10 can be again aligned with the tracks 20 of the racks 11 and a supporting pallet 12 from the tracks 20 onto the tracks 21 and the locking arms 20 pulled up into a locking position. The arcuate ends 27 on tracks 21, and 45 on tracks 20, allow the runners 18 to pass from tracks 20 to tracks 21 or from tracks 21 to tracks 20 even with slight misalignments in that the arcuate surfaces 27 will engage the ends of the runners 18 and guide them onto the track between the guide members 25 of track 21, or 44 of track 20.

In normal operation, the containers 14 are filled with soil and have cuttings or seeds inserted into the soil and are loaded upon pallets 12 where they are moved into a greenhouse or a covered area where they are watered and maintained until the rooting is completed at which time they are moved on the carts 10 into the loading area, at which time the plants 15 in their containers 13 are transferred from the pallet 12.

Figure 3:
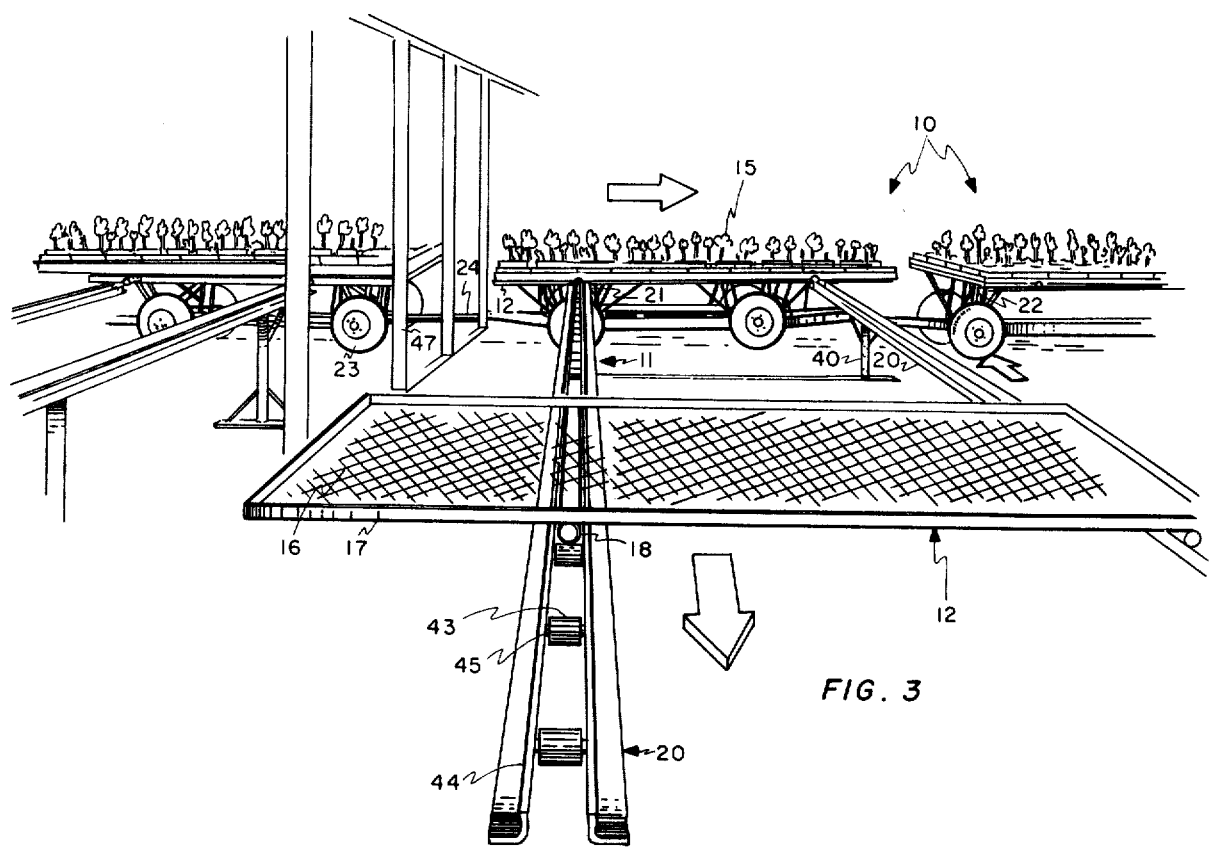
FIG. 3 is a perspective view of the plurality of aligned carts aligned with a plurality of pallet support racks and loaded with pallets.

Referring now to FIG. 3, the system is illustrated in operation having a plurality of carts 10 interconnected and lining up with a plurality of cart support racks 11 and containing a plurality of pallets 12 loaded with plants 15. Each cart 10 has wheels 23 along with a frame 22 and parallel tracks 21. Each rack 11 has a pair of parallel tracks 20 having wooden rollers 43 riding on steel shafts 45 connected between pairs of guide members 44. The tracks 20 are attached to frame members 20 which are attached to the bases 41 and allows the pallet 12, cylindrical runners 18 to ride on the rollers 43 while being maintained on the track by the guides 44. The runners 18 are connected to the frame 17 which can be welded angle iron having a heavy steel wire bottom 16 welded or otherwise attached to the frame 17. The runners 18 could be welded to the frame 17 and thereby provide additional support for the pallets but at any rate the pallets must be of sufficient rigidity to maintain the alignment of the parallel runners 18. The bases 41 of the racks 11 set upon a flooring 46 which must be sufficiently level and smooth that tracks 20 will maintain substantially the same height as the tracks 21. Thus the tracks on the carts 10 along with the racks 11, tracks 20 must be maintained at substantially the same height and substantially parallel at the same predetermined distance between the parallel tracks. The guide members 44 and the rollers 43 are sufficiently wide enough to allow for minor variation in the separation of the tracks. It should be noted that the internal guide rails of the tracks could be eliminated without departing from the spirit and scope of the invention inasmuch as the outer guide rails would still maintain the runners 18 in position. The distance between carts is maintained by the rigid construction of the carts and the exact distance maintained therebetween by tongues 24 in order for the entire system to operate. The floor 46 must be reasonably level and all of the racks 11 placed in predetermined alignment with each other and with markings on the floor as illustrated by the arrow in FIG. 3 but which could also be made on post 47 so that stopping the towing truck will align all of the carts 10 with racks 11.

Figure 4:
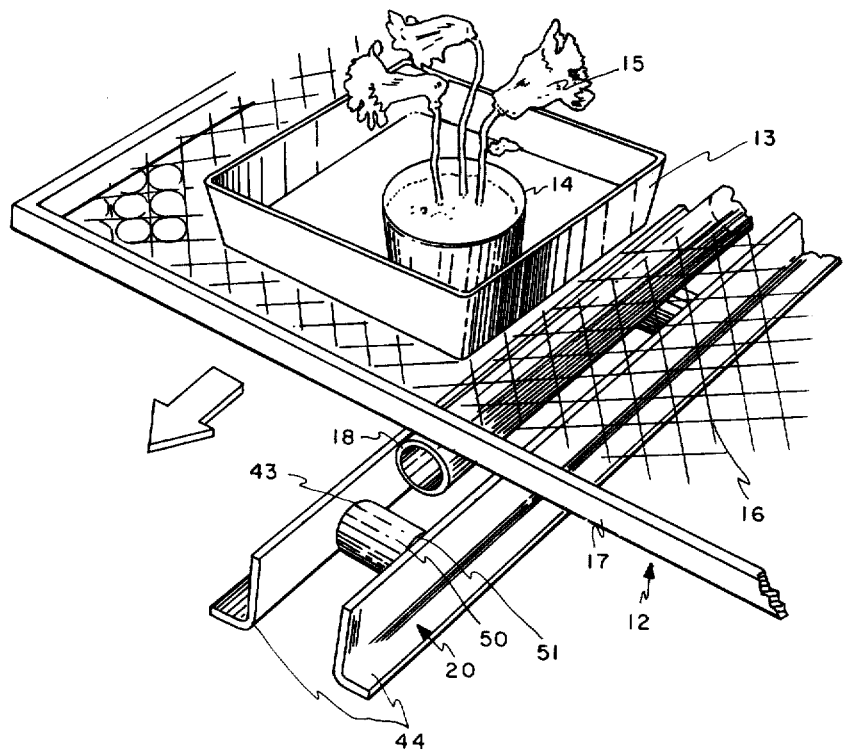
FIG. 4 is a perspective view of a portion of a track and pallet illustrating the operation of the pallet rail riding over the rollers of the track.

FIG. 4 more clearly illustrates the track 20 having a pair of guides 44 which may be made of angled iron providing a welding surface for the bottom and a guide surface with the other angle which may have rollers 43 mounted therebetween on steel shafts as can be seen in FIG. 3. The runners or rails 18 on the pallets 12 may be seen attached to the frame 17 which also may be welded angle iron if desired, and the bottom of the pallet 16 may be heavy gauge steel wire welded to the frame. Steel wire allows excess water from watering of the plants to flow through the pallet onto the floor where it can run off or evaporate and for air to flow up from beneath the plants to enhance growth. Runners 18 are galvanized steel cylindrical pipe but could of fourse be of different shapes and materials, as desired. Plants 15 are supported in the plant growing containers 14 which are in turn in containers 13 which may hold a plurality of plants on the bottom 19 of the pallet 12. Each container 13 can hold a plurality of plants therein for easy movement onto and off the pallet in loading or unloading operations. FIG. 4 also illustrates the rollers 43 as having an oil impregnated hardwood 61 encased or partially encased in a steel sleeve 50. The sleeve 50 can be press fitted and on the wood roller and can be made of materials other than steel, if desired. The oil impregnated wood 51 eliminates the need for bearings and lubrication and the steel sleeve 50 provides a long wearing surface.

Figure 5:
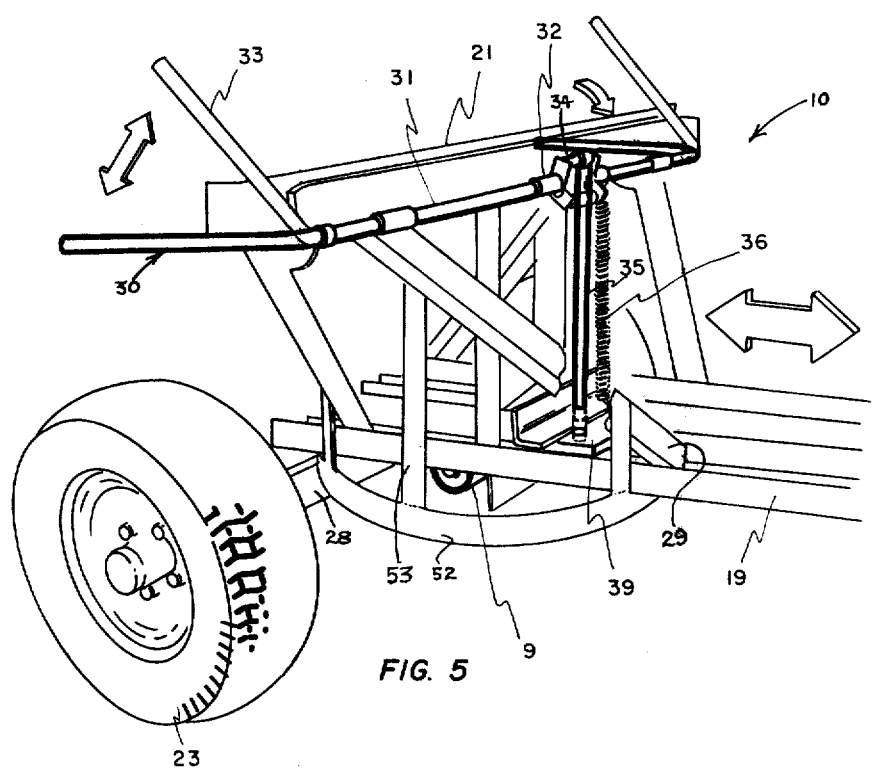
FIG. 5 is a perspective view of a portion of a cart illustrating a modified embodiment.

FIG. 5 more clearly illustrates the operation of the locking mechanism 30 having a pair of arms 33 connected by bar 31 which has a U-shaped section 34 therein and rides in sleeves 32 attached to the tracks 21. The mechanism is shown in dark lines in its pulled down position with light lines illustrating its swinging into an upright position. Spring 36 is connected to the U bar 34 and holds the arms 33 in an upright position which would be its normal position. The arm 33 may be pushed down from either side of the cart 10 and held down while the operator slides the pallet off the track 21; then the arm may be released and it will swing back up in its upright position. The bar 35 is connected to the U-shaped member 34 by a sleeve and swings down into an opening in a plate 39 which locks the upper frame portion 29 to the rails 19. This is identical with the embodiment of FIG. 2 and has the wheels 23 connected to the axle 28. This embodiment differs slightly in that an arcuate support frame member 52 is connected to the upper frame portion 29 and has upright members 53 and is used to provide the cart with additional support against tilting when the loaded pallets are being moved off the cart and onto the support racks. One of the rollers 9 can also be seen in this view as having a metal sleeve covering the wooden roller which is rotatably attached to a shaft which is in turn attached to the tracks 19.

It should be clear at this point that an apparatus and method for handling plants in greenhouses or other horticulture operations has been provided. This invention is not to be construed as limited to the particular forms disclosed herein since these are to be regarded as illustrative rather than restrictive.

I claim:

1. A greenhouse transporting system comprising in combination:
   a. a cart having a frame; wheels connected to said frame for said frame to roll on; a pair of tracks in parallel spaced relationship with each other and fixedly attached to said frame; each said track having rollers thereon and at least one guide member;
   b. a pallet for loading plant containers upon, said pallet having a pair of runners attached thereto in parallel spaced relationship with each other by a distance to ride upon said rollers on said cart tracks;
   c. a pallet support rack having a supporting frame and having a pair of tracks in parallel spaced relationship with each other, each track having rollers thereon and at least one guide member and being spaced from said pallet runners to ride upon the rollers thereon; and
   d. said cart frame having a first portion slidable on a second portion for aligning said cart roller track with said rack roller tracks; whereby a cart can have its tracks aligned with said support rack tracks and said pallets pushed from said cart to said rack and from said rack to said cart.

2. The transporting system in accordance with claim 1 in which said cart has a pallet locking means attached to said frame for holding a pallet on said cart while being transported on said cart and said locking means being disengageable for removing said pallet from said cart.

3. The transporting system in accordance with claim 2 in which said pallet locking system has a pair of swinging arms movable to a position on either side of said cart to block said pallets from rolling on said roller tracks.

4. The transporting system in accordance with claim 3 in which cart rolling tracks are open at each end whereby said pallet can be moved off either side of said cart.

5. The transporting system in accordance with claim 1 in which said cart roller track guides and said support roller track guides each have curved ends to guide slightly misaligned pallets from one to the other.

* * * * *